United States Patent

Nowicke, Sr.

[11] Patent Number: 5,564,330
[45] Date of Patent: Oct. 15, 1996

[54] GRILL COOKER AND SMOKER COMBINATION

[76] Inventor: Frank L. Nowicke, Sr., P.O. Box 20168, 55 Grasso Plz., St. Louis, Mo. 63123-0368

[21] Appl. No.: 537,152

[22] Filed: Sep. 6, 1995

[51] Int. Cl.$^6$ .............................. A47J 37/06; A47J 37/07
[52] U.S. Cl. .................. 99/340; 99/444; 99/482; 126/9 R; 126/25 R
[58] Field of Search .................... 99/481, 482, 448, 99/352–355, 339, 340, 450; 126/25 R, 9 R, 30

[56] References Cited

U.S. PATENT DOCUMENTS

| 4,094,295 | 6/1978 | Boswell et al. | 126/25 R |
| 4,334,462 | 6/1982 | Hefling | 99/385 |
| 4,535,749 | 8/1985 | Schlosser et al. | 126/25 R |

OTHER PUBLICATIONS

L. L. Bean Catalog, Brinkman "All–in–One Cooker", p. 18B, Summer 1996.

*Primary Examiner*—Timothy F. Simone
*Attorney, Agent, or Firm*—Polster, Lieder, Woodruff & Lucchesi, L.C.

[57] ABSTRACT

A cooking grill modified by a cylindrical sleeve to convert the grill into a food smoker in which there is a sleeve in cylindrical form carried on the cooking grill to position a food supporting grill spaced from the source of heat, and providing handles on the cylindrical sleeve in position to allow removal of the sleeve to free up access to the fuel in the cooking grill.

2 Claims, 2 Drawing Sheets

GRILL COOKER AND SMOKER COMBINATION

BACKGROUND OF THE INVENTION

1. Field of the Invention

This invention is directed to a grill cooker and smoker combination for rendering a grill cooker convertible into a smoker in which a grill cooker can increase its utility.

2. Description of the Prior Art

The relevant prior art for grill cookers is known to have a bowl in which the fuel for cooking is deposited beneath a grill which supports the objects to be cooked are placed. The cooker is provided with a cover to reflect the heat back to the grill to retain the heat and smoke. While smoke can influence the taste characteristics of the objects placed on the grill, the closeness of the objects on the grill to the burning fuel results in rapid cooking which prevents obtaining a desired smoked taste quality.

Attempts have been made to devise a cooker that is able to convert to a smoker in a single embodiment, such as shown in a Weber-Stephen Model No. 2890. That embodiment requires an access door to the fine area for the addition of fuel. The objection is that the method of introducing fuel for smoking is very haphazard in regard to being able to establish the right amount of fuel which is an important aspect for obtaining good smoking results.

SUMMARY OF THE INVENTION

The object of the invention is to convert a grill type cooker to one that can be employed to produce smoked product as an added feature to the normal use as a grill cooker.

A further object is to produce a smoker feature to a grill cooker by providing a lift-off smoker sleeve to make access to the fire area easy.

Yet another object is to provide a smoker device that is easily removed while hot so that the fuel can be controlled as to content and amount to provide a desired smoke result.

Still another object is to provide a smoker device that can be quickly and easily removed and replaced so as not to disturb or cool the product during the smoking process.

In addition, fuel for smoking can be easily dampened to produce the quality of smoke that is desired, the fuel dampening step being accomplished before introduction to the fire area. Other objects will be referred to in the following details of the smoker device disclosed in a preferred embodiment in drawings as follows.

BRIEF DESCRIPTION OF THE DRAWINGS

A preferred embodiment of the invention is seen in the several drawing views, wherein.

DETAILED DESCRIPTION OF THE INVENTION

Figure 1:
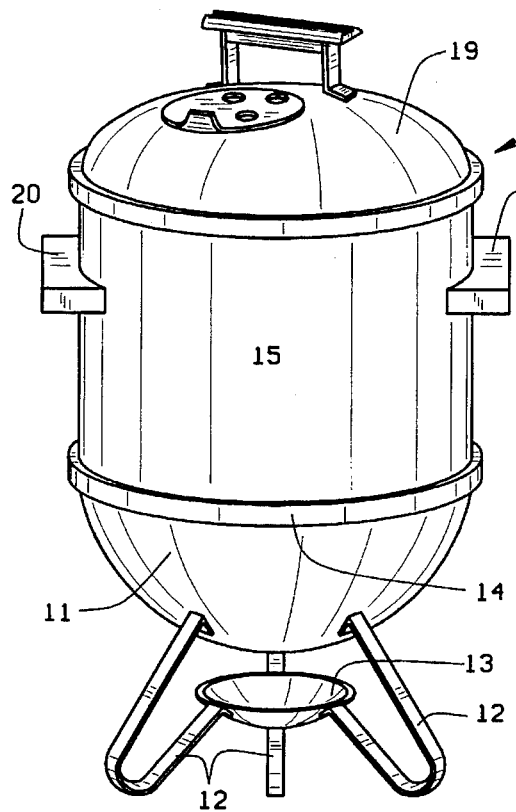
FIG. 1 is a perspective view of a smoker assembly for converting a cooking grill to a second use.
Figure 2:
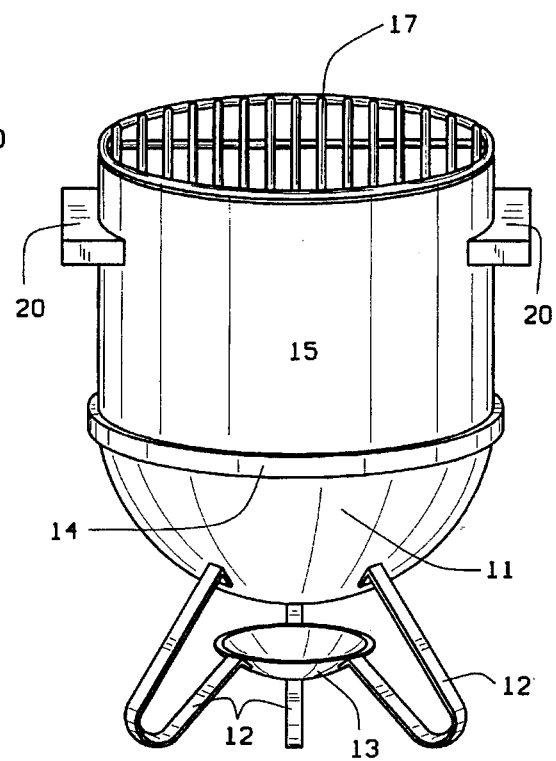
FIG. 2 is a view similar to FIG. 1 with the cover removed to show a grill on which objects can be placed for smoking.
Figure 3:
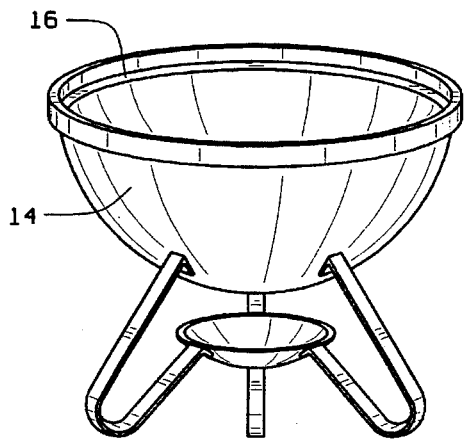
FIG. 3 is a view of the base unit of a fuel holder useful in the smoker of FIG. 1.
Figure 4:
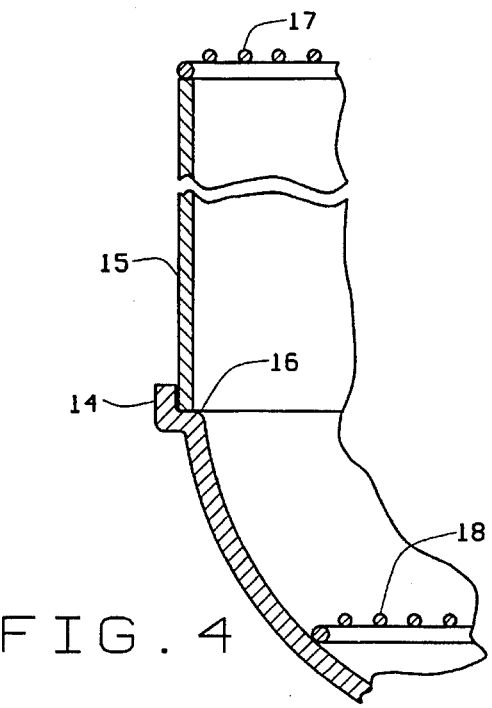
FIG. 4 is a fragmentary view of the smoker assembly to show the elevations of the smoker grill above the fuel supporting grate.
Figure 5:
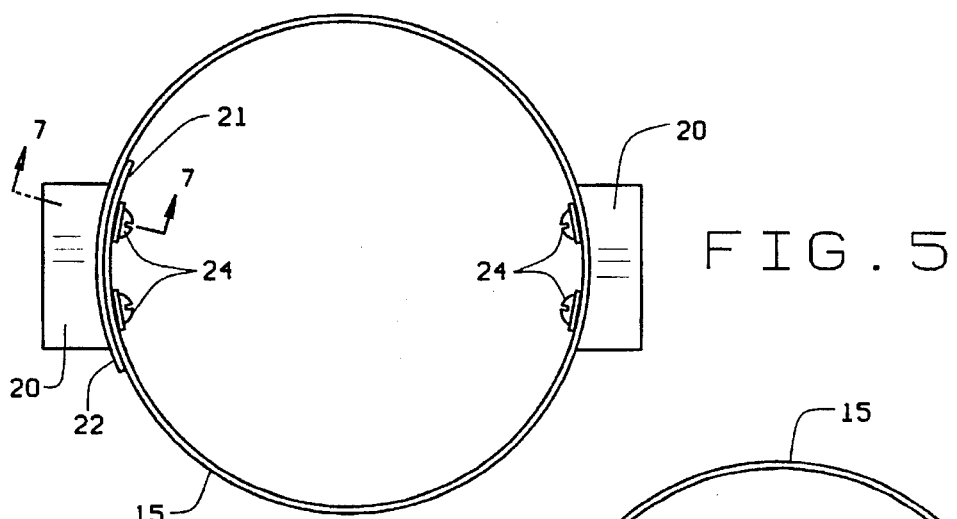
FIG. 5 is a top plan view of the smoker sleeve in its assembled condition.

A preferred embodiment of a grill cooker and smoker combination 10 comprises a fire containing base 11 supported on at least three tripod legs 12 which carry an ash receiver 13. The base 11 is formed with an upwardly presented rim 14. The base 11 supports a sleeve 15 which has a circumferential size selected to fit within the base rim 14 on the step 16 seen in FIGS. 3 and 4. The assembly in FIG. 2 has the sleeve 15 in position to support a grill 17 on the upper end of sleeve 15 so food to be smoked can be sufficiently above the heat to slow the cooking process and to give the rising smoke time to penetrate the food supported on the grill 17. The assembly seen in FIG. 4 illustrates an important aspect of the invention which is to support the grill 17 from the top edge of the cylindrical sleeve 15, and spaced from the grate 18 on which the fuel can be placed.

It will be appreciated from the views of FIGS. 1, 2, 3 and 4 that an important feature of the embodiment resides in the easy ability to lift the sleeve 15, with or without a cover 19 off the base 14 by grasping the non-heat absorbing handles 20 and lifting the sleeve off to expose the heat source on the grate 18. This procedure can be accomplished without disturbing the food on the grill 17 or without removing the cover 19 which could retain the heat and smoke while adjusting the fuel on the grate 18 or adding more fuel.

A unique feature of the invention is disclosed in the several views of the drawings of FIGS. 5 to 8 inclusive. For example, in FIG. 5 the sleeve 15 is circumferentially sized so its opposite ends 21 and 22 can lap over each other to gain a circumferential size to fit on the base flange step 16. The spaced ends 21 and 22 are secured in position by a handle 20 having threaded socket elements 23 embedded in the handle to receive performed apertures (FIG. 7) in alignment so retaining bolts 24 can be employed in the usual manner. A second handle 20 (FIG. 6) can be installed on an opposite diameter of sleeve 15 by the use of similar sockets 23 and bolts 24 of the character shown in FIG. 7.

Figures 6, 7:
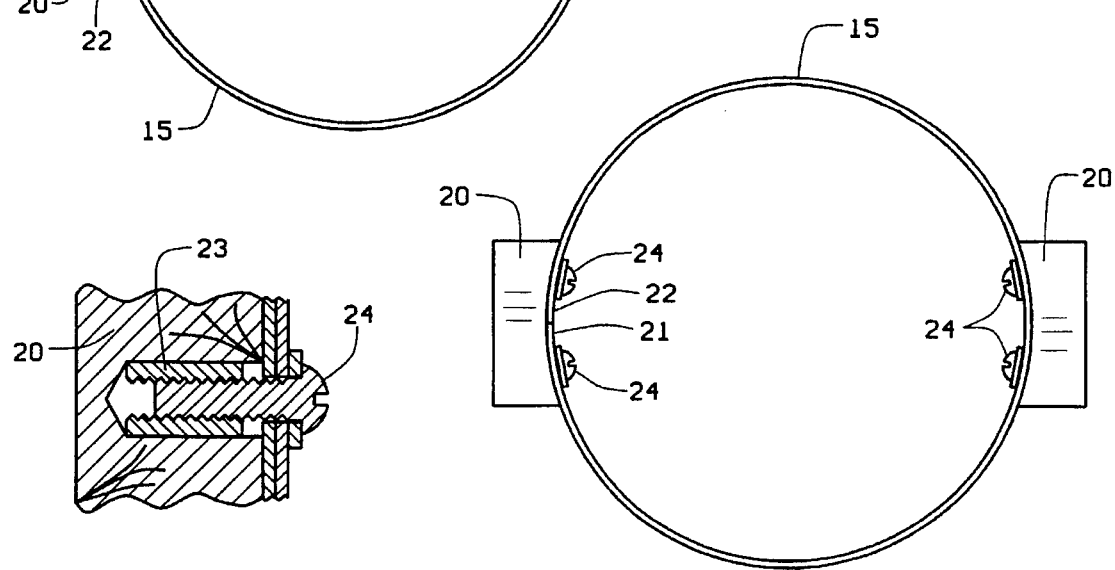
FIG. 6 is a plan view of a smoker sleeve in a modified form.
FIG. 7 is a fragmentary sectional detail seen at line 7—7 in FIG. 5.

A modified assembly of sleeve 15 is shown in FIG. 6 where the sleeve 15 can have ends 21 and 22 secured in butted positions by a handle 20. Thus, a different length of sleeve 15 can be employed in FIG. 6, as compared to FIG. 5. In either case the material of sleeve 15 can be any suitable metal having a thickness capable of retaining a cylindrical strength and stiffness as desired.

Figure 8:
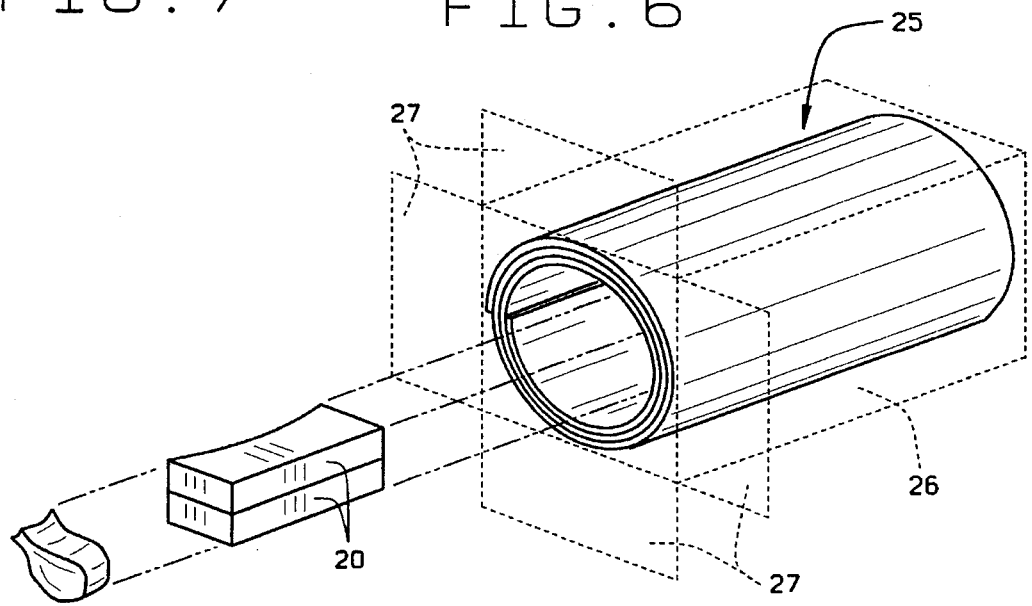
FIG. 8 is a perspective view of a form of the invention arranged as a sales kit to convert a cooker grill to a smoker.

A further unique feature of the invention is seen in FIG. 8. In that view, a sleeve 15 is provided to have the ability to be rolled into a tubular shape 25 until it assumes a tube having an eight inch diameter suitable to be slidably received in a box 26 with a pair of handles 20 enclosed inside the tube before the box end flaps 27 are closed and/or sealed. Thus, the sleeve 15 and handles 20, with the described hardware 23 and 24, can be sold in kit form to be assembled in the manner shown in FIGS. 5 and 6 to convert a cooking grill into a smoker.

While a preferred embodiment of the invention has been described in the foregoing description, it can be appreciated that the sleeve and handles can be merchandised in loose form, or conveniently boxed in a manner shown in FIG. 8.

What is claimed is:

1. In a food cooking grill and a fire containing base with an open top for said grill, the combination of an attachment for food smoking comprising:

a) a metallic sheet having opposite longitudinal edges brought into adjacency to form a cylindrical sleeve with opposite open ends;

b) a pair of handles for said cylindrical sleeve to be able to move said cylindrical sleeve relative to said open top base; and c) hardware connecting said handles to said cylindrical sleeve to hold said metallic sheet in the cylindrical sleeve form, said hardware being adapted to retain one of said handles in position to bridge said opposite edges of said metallic sheet, and one of said opposite open ends of said cylindrical sleeve being sized to engage said open top of said fire containing base.

2. A kit containing disassembled components for converting on reassembly a cooker grill having a fire containing base into a food elongated cylinder for smoker supporting said grill spaced from the base, said disassembled components in the kit comprising:

a) a flat metallic sheet having side edges free to allow said sheet to be rolled into a tube from an elongated cylinder with the side edges lapped around the rolled tube;

b) handles contained in said rolled tube ready to be removed into positions for attachment to said cylinder; and c) handle attachment hardware in said rolled tube free to be moved into positions for attaching said handles to said cylinder to convert said rolled tube into the elongated cylinder with said handles exposed on said cylinder in which one handle is attached to bridge the side edges of said flat sheet and retain the latter component in the cylinder shape.

\* \* \* \* \*